Sept. 23, 1969     G. E. HOERNES ET AL     3,469,257
AUTOMATIC CONTROL APPARATUS Filed Dec. 21, 1965     2 Sheets-Sheet 2

United States Patent Office 3,469,257
Patented Sept. 23, 1969

3,469,257
AUTOMATIC CONTROL APPARATUS
Gerhard E. Hoernes and Edward V. Weber, Poughkeepsie, N.Y., assignors to International Business Machines Corporation, Armonk, N.Y., a corporation of New York
Filed Dec. 21, 1965, Ser. No. 515,362
Int. Cl. G08c 9/00
U.S. Cl. 340—347                                7 Claims

ABSTRACT OF THE DISCLOSURE

Apparatus for accurately positioning a moveable element such as a machine tool. The position error between a digital address representing the desired location, and the physical location of the moveable element is calculated by a control circuit. The circuit includes a phase comparator which produces an analog error signal which is exactly proportional to the position error. The analog signal is utilized to cause the element to move in a direction which tends to reduce the error to zero.

---

Figure 1:
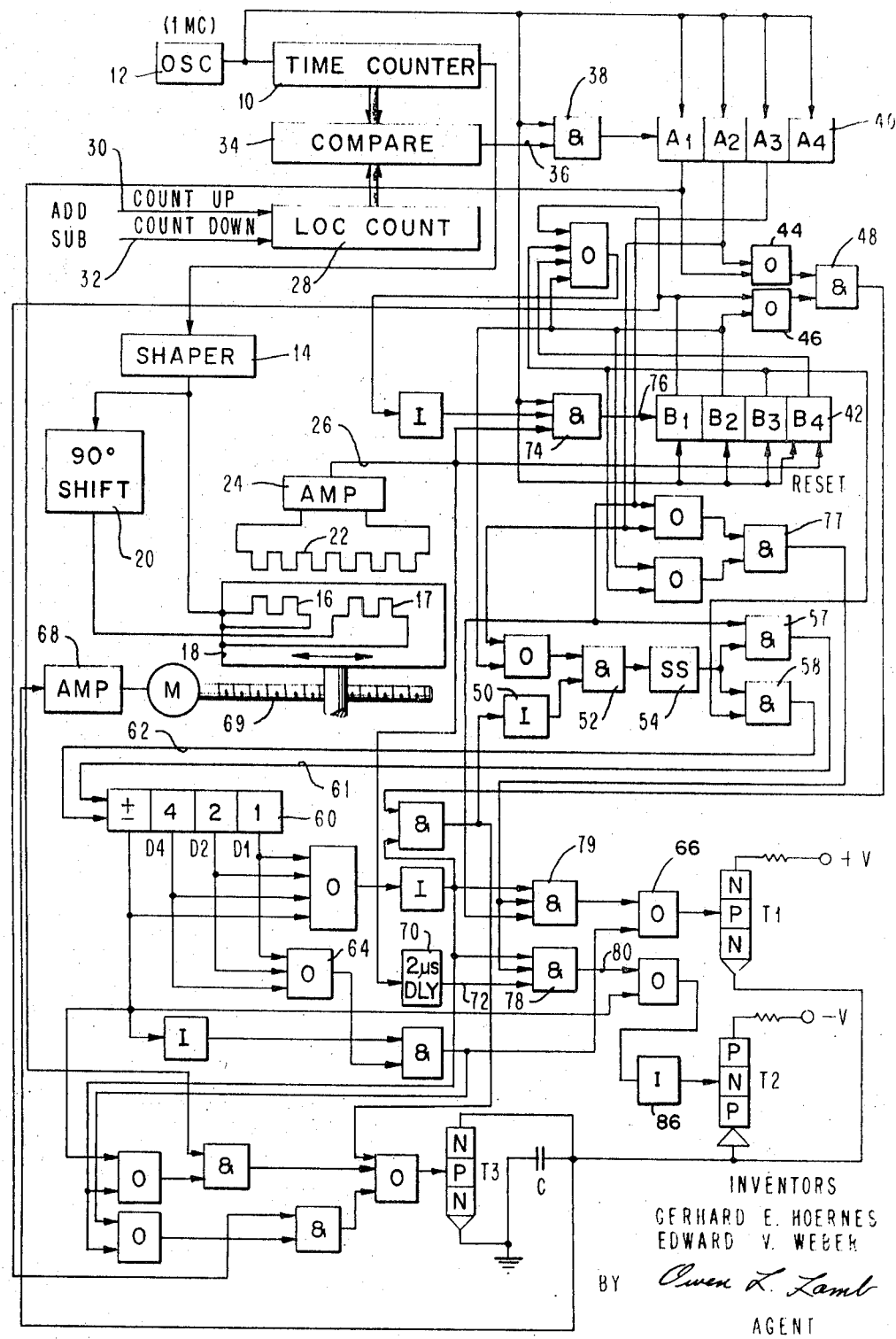

This invention relates to automatic control systems, and more particularly to positioning systems for accurately positioning a movable element.

A numerical control system accurately controls the speed and path of a machine tool relative to a work piece or moves a machine tool bed holding the work piece relative to the machine tool. Each pulse in a train of pulses corresponds to a discrete increment of motion of the work piece relative to the machine tool. For example, if the control system generates ten pulses the machine tool obeying the command moves a distance of ten times the incremental distance defined by each pulse. The frequency of the pulses defines the velocity and this may be used to control the speed of motion of the machine tool or of the machine tool bed.

The path length and the velocity commands of the control system are represented by the phase and the rate of change of the phase of a command position signal applied to a servo-mechanism which in turn is coupled to and drives the machine tool bed. A sensing mechanism on the tool bed generates a feedback signal whose phase is representative of the present actual position of the machine tool bed. The phase of the command position signal is compared with the phase of the actual position feedback signal and an error signal directly proportional to the phase difference is generated. Depending upon whether the command signal leads or lags the phase of the actual position signal, the machine tool is moved in a direction which tends to reduce the magnitude of the error signal.

Prior devices are known which compare the phase of the two signals by utilizing a reversible counter which is counted in one direction by timing pulses gated by the command signal, and is counted in the opposite direction by timing pulses gated by the feedback signal. A digital-to-analog converter is used at the output of the counter for generating an analog signal whose magnitude is proportional to the number of units of difference between the commanded position and the actual position, registered in the counter. Thus, if the actual position of the machine tool lags behind the commanded position by an amount which is greater than 180° phase difference, the reversible counter will keep track of this phase difference by recording the difference in the counter.

Such prior art devices are accurate only to a specific unit of error which depends upon the frequency of the timing pulses which step the counter and essentially quantize the error signal. Thus in the prior art devices the error sensing does not provide an error signal which is exactly poportional to position error when the difference between the actual position and the commanded position falls below the frequency of the timing pulses.

It is a paramount object of this invention to provide a phase comparison means which produces an error signal which is directly proportional to position error.

It is also an object of this invention to provide a phase comparison means which provides an error signal which is proportional to position error at least for error values ranging from zero to a predetemined position error.

It is also an object of this invention to provide means for generating a time reference pulse train for use in a numerical control system, which pulse train may be rapidly modified at predetermined times in a cycle without disrupting the operation of the control system.

The above objects are accomplished in accordance with the invention by providing a time counter which provides both chronological and position reference pulses for all axes of the machine. Static location counters are provided for each axis to store desired machine position addresses which can be altered by adding to or subtracting from the contents of the counter. When a time and a location counter on an axis are compared, a pulse is generated whose position in the time scale indicates the position on that axis to which it is desired to move the machine tool bed. A feedback signal is generated from a scale located on the machine bed and the position of the feedback signal zero-crossing indicates where the machine bed is in reference to the time counter. Position error is directly proportional to the time difference between the leading edge of a compare and the nearest positive feedback zero-crossing.

An analog error voltage is generated by integrating either a plus or a minus constant current with a capacitor during the time lapse between a compare and a feedback positive zero-crossing. The first pulse (compare or feedback) received is anticipated by circuitry which causes a discharge of the capacitor at the beginning of a cycle. Further circuitry is provided for determining whether or not the error is greater than a predetermined value, such as 2 microseconds which corresponds to two pulses. If it is, then the pulses are used to count up or count down an error counter. Hence, the error counter contains digits for a length of time corresponding to the time between a compare and a feedback, quantized to a microsecond by an oscillator which steps the counter.

If the separation between the feedback and the compare pulses is less than 2 microseconds then the reversible counter is over-ridden and a signal is logically produced which is directly proportional to the actual difference between the error feedback pulse and the time reference pulse.

The invention has the advantage that the error signal is proportional to position error, whereas in prior systems the error signal is quantized to the closest integer recordable by the count-up-count-down counter.

Since the error signal is not tied to the oscillator repetition rate, the exact position error is obtained. The time interval between the count-up and count-down of the reversible counter is proportional to the error between the theoretical location of the bed and its actual location.

The foregoing and other objects, features and advantages of the invention will be apparent from the following more particular description of a preferred embodiment of the invention, as illustrated in the accompanying drawings.

Figure 2:
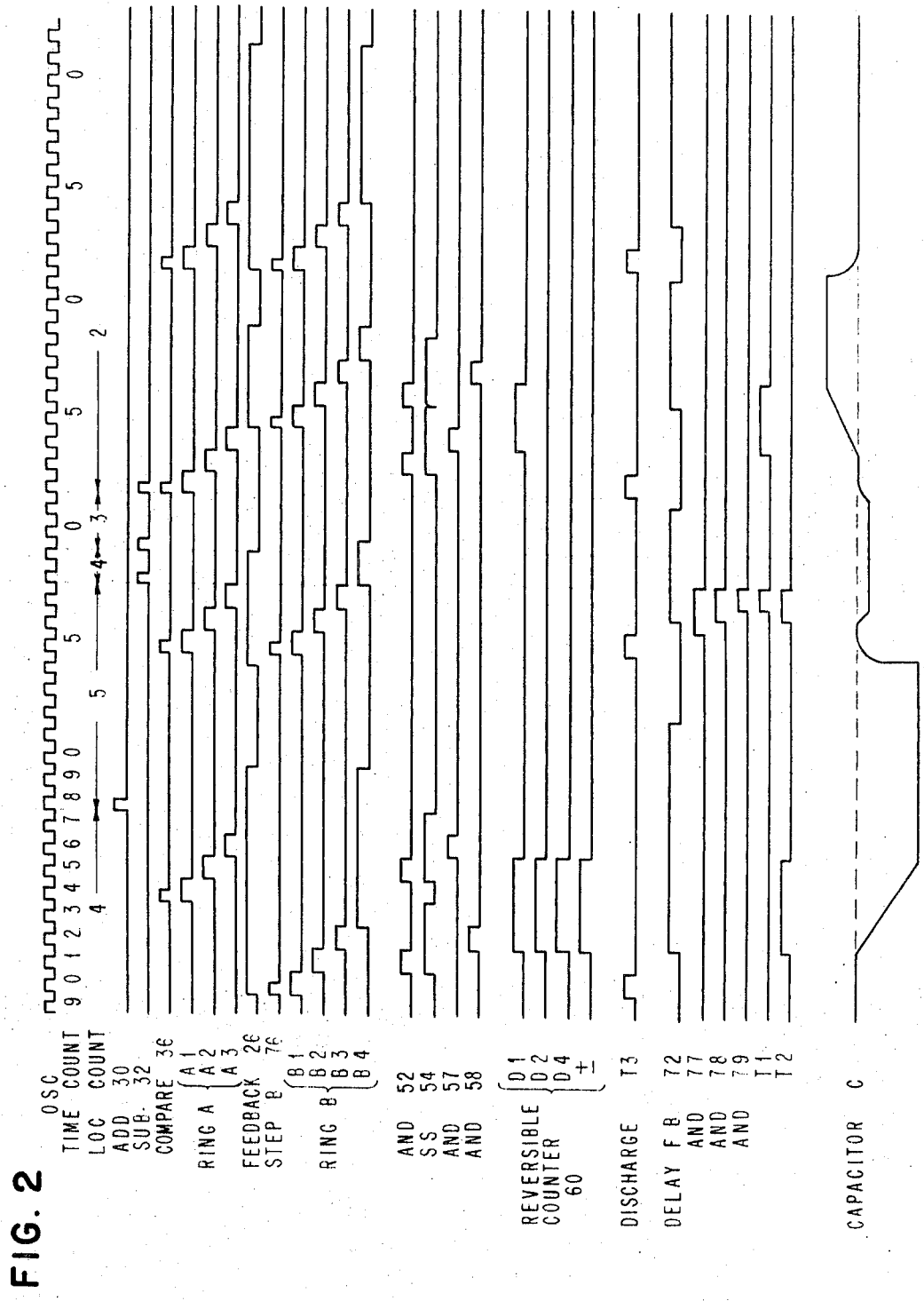

In the drawings:

FIG. 1 is a block schematic diagram of a control system constructed in accordance with the invention; and FIG. 2 is a timing diagram illustrating voltage levels at various points in the logic shown in FIG. 1.

Referring now to FIG. 1, the time reference counter 10 is driven from an oscillator 12 and continuously counts up to a particular value (9 in the timing example shown in FIG. 2), is reset, and begins counting again. This time base divides the distance which the machine tool table may be moved into precise time increments. The last stage of the time counter drives a shaper 14 which converts the digital output into a sine wave. The sine wave is applied to one coil 16 of a Farrand type scale, (see Inductosyn Principles and Applications published by Farrand Controls, Inc., 4401 Bronx Blvd., New York, N.Y.), located on the machine tool bed 18. The shaped sine wave is also shifted 90° by phase shifter 20 and applied to the other coil 17 of the Farrand scale. The Farrand scale coil 22 on the stationary part of the bed has pulses induced therein which are amplified by amplifier 24. The pulses generated at the output 26 are timed with respect to the time reference counter so that they indicate, by their position on the time scale, where the machine tool is actually located. The shaped feedback pulse 26 is shown in the timing diagram of FIG. 2 as occurring initially at time 0 in a cycle.

A location counter 28 is provided which can be counted up or counted down by input pulses 30 or 32 applied thereto. The contents of the location counter are compared with the time counter in a compare circuit 34. The output 36 of the compare circuit is sampled by the oscillator pulses at AND circuit 38 and the point at which a pulse occurs at the output of AND 38 indicates, by its position on the time scale, the location to which it is desired to move the table.

Referring to the timing diagram of FIG. 2, the location count is initially 4. Therefore, the location counter and the time counter compare at 4 time in a cycle. When such a comparison occurs, an oscillator pulse is gated out of the AND circuit 38 generating a pulse at 4 time in each cycle. As long as the contents of the location counter remain unchanged the pulses from the AND circuit 38 are generated at 4 time in each cycle of the time counter.

A pulse train from an interpolator (unshown) is applied to step the location counter up or down depending upon whether it is desired to move the table in a positive or negative direction. The frequency of the pulse train determines the velocity at which the table is moved. Pulses 36 generated by the compare circuit are applied to ring A(40) starting the ring which is then stepped through 4 cycles by the oscillator pulses 26. Feedback pulses from the amplifier 24 are sampled at AND 74 by oscillator pulses to start a ring B(42) which is then stepped through 4 cycles. As shown in the timing diagram of FIG. 2, initially the difference between the feedback pulses 26 and the desired-location compare pulse 36 is 4 microseconds, and, since the feedback pulses are leading, motion of the table must be in a negative direction.

If ring A stages A1 or A2 are on and at the same time B1 or B2 are on, then the difference between the two pulses is less than 2 microseconds. OR's 44, 46 and AND 48 test for this condition. Since this condition is not met during the first cycle of the timing diagram, the output of inverter 50 is positive and one leg of AND 52 is energized. This allows ring stage A2 or B2 (whichever turns on first) to fire single shot 54. Since the feedback pulse is leading in the example of FIGURE 2, stage B2 fires the single shot. The output of the single shot 54 lasts for 3 microseconds to allow a pulse from stage B3 to be gated via AND 58 to the reversible counter 60 count-down input 62. The ± stage of counter 60 is energized, the transistor T2 is turned on, and a negative current is supplied to the capacitor C. The output of the capacitor supplies a DC voltage to an amplifier 68 which causes a motor M to turn in proportion to the amplitude of the voltage applied to it. As the motor turns the lead screw 69, the table bed 18 moves in the reverse direction closer to the desired location.

A discharge pulse must be produced at the beginning of each cycle to discharge the capacitor C. A discharge pulse is produced every A1 or B1 time depending upon whether the feedback pulse leads or lags the location counter pulse. This is accomplished by logic which turns on transistor T3, which then provides a discharge path across capacitor C. In FIGURE 2, since the feedback pulse initially leads the location counter pulse, the discharge pulse occurs at B1 time.

The situation where the feedback lags the location count by ½ microsecond is shown during the second cycle in the timing diagram. An add pulse 30 is also shown incrementing the location count to 5, which means that a current must be applied in the proper direction to charge the capacitor to cause the table to move to position 5. Pulses 76 gated through the AND circuit 74 (which is now energized by the feedback pulse) cause the ring counter B to be stpped sequentially under control of oscillator pulses. Upon the appearance of a compare signal at time 5 in the time reference, ring A is stepped. In this example, rings A and B step concurrently because the error difference is less than the oscillator period of 1 microsecond.

The feedback pulse 26 is delayed by 2 microseconds in delay circuit 70 to compensate for the shift through the first two states (A1, A2; B1, B2) of ring circuits A and B. The delayed feedback pulse 72 is gated at AND 78 by the occurrence of A2 or A3 and B2 or B3 of the ring counters, which indicates that the difference between the feedback and location count pulses is less than 2 microseconds. The delayed feedback must occur within this 2 microsecond period, otherwise the difference between the feedback and the location count pulse would be greater than 2 microseconds. The gated delayed feedback output 80 is used to supply negative current via the charging transistor T2 to cause the voltage on the capacitor to build up in a negative direction for as long as a negative current is applied thereto. The negative current begins at the rise of the delayed feedback pulse and is cancelled out by a positive current delivered by T1 occurring when A3 stage turns on. Stage A3 of ring A1 is turned on at exactly 2 microseconds after the compare output pulse which indicates where the table ought to be. Thus the total current tending to charge the capacitor in a negative direction lasts for a duration which is equal to the absolute difference between the feedback pulse and the compare pulse.

Further on along in the timing diagram the contents of the location counter are reduced from 5 to 4 by a pulse on the subtractor line 32, 1½ microseconds later from 4 to 3, and 2½ microseconds later from 3 to 2. This illustrates that with the novel arrangement of a *static* location counter, its contents may be changed without impairing the operation of the control circuit. Thus the counter contents were stpped from 5 to 2 between compare pulses. The next compare pulse 36 occurs at 2 time in the third cycle whereas it occurred at 5 time in the previous cycle. The operation of the circuitry is similar to that described above. The compare pulse now leads the feedback pulse and therefore initiates the stepping of ring A first. The feedback pulse arrives 3 microseconds later and initiates the B ring step pulse 76 which starts the B ring into operation. Since the difference between the location count and the feedback pulse is greater than 2 microseconds (as determined by OR's 44, 46, and AND 48), the single-shot 54 fires, thus allowing an output 61 from the AND 57 to count the reversible counter up and an output 62 from the AND 58 to count the reversible counter down. The reversible counter is on, therefore, for exactly 3 microseconds which is directly proportional to the difference between the feedback and the location count pulses. Since the reversible counter is now counting in the positive direction, a positive current is generated via transistor T1 to charge capacitor C for the duration of the count.

During the last cycle of the time counter shown in the timing diagram, a compare pulse is shown occurring at time 2 and the feedback pulse is shown occurring simultaneously therewith. This means that the table has now moved to the exact position to which it was desired to move it. Thus the ring A and the ring B commence stepping, and step in unison. No output occurs at AND 52 and the single-shot 54 is not fired. Therefore the count-up-count-down counter is not stepped by either A or B ring counter pulses. A discharge pulse occurs at time A1 in the ring cycle, bringing the charge in the capacitor down to zero. Since there is no difference between the feedback pulse and the location count pulse no charge is placed on the capacitor and the motor is not moved at all.

While the invention has been particularly shown and described with reference to a preferred embodiment thereof, it will be understood by those skilled in the art that various changes in form and details may be made therein without departing from the spirit and scope of the invention.

What is claimed is:

1. A phase detector for generating an analog voltage which is proportional to the time difference between first and second signals when said difference is less than a predetermined amount, comprising:
    two ring circuits;
    means for stepping said ring circuits;
    means responsive to said first signal for initiating stepping of said first ring;
    means responsive to said second signal for initiating stepping of said second ring;
    means for delaying one of said signals by said predetermined amount, which amount is equal to the amount of time it takes to step one of said rings to a predetermined stage thereof;
    means for comparing the stages of said first ring with the stages of said second ring to determine if the time difference between said signals is less than said predetermined amount; and
    means operative when the time difference between said signals is less than said predetermined amount of utilizing the output of said delay circuit and the predetermined stage of the ring which is energized by the first occurring one of said signals, to thereby generate the analog voltage.

2. The combination according to claim 1 wherein said comparing means comprises means for determining if the first stage of both rings are on simultaneously.

3. The combination according to claim 1 wherein said utilizing means includes a current summing network in which a voltage of a first polarity is generated in response to the output of said predetermined stage of said first ring circuit and a voltage of the opposite polarity is generated in response to the output of said delaying means, such that the delayed output signal causes a sum total current of said opposite polarity and the output of said predetermined stage provides a sum current of said first polarity to thereby cancel out the effect of said opposite polarity current, whereby the total current is maintained for a length of time equal to the difference between said two signals, and is of a polarity which corresponds to the relative phase of said signals.

4. A positioning system for positioning a moveable element, comprising:
    a first ring circuit;
    a second ring circuit;
    means for stepping said ring circuits;
    means responsive to a desired location pulse for initiating stepping of said first ring;
    means responsive to a feedback signal indicating the actual location of the moveable element for initiating stepping of said second ring;
    means for delaying said feedback signal by a predetermined amount, which amount is equal to the amount of time it takes to step said rings to a predetermined stage thereof;
    means for comparing the ring stages to determine if the time difference between said signals is less than or greater than said predetermined amount;
    means operative when the time difference between said signals is greater than said predetermined amount for gating corresponding positions of each ring to a count-up/count-down counter, which is counted up by the stage of one of said rings and is counted down by the stage of the other of said rings; and
    means responsive to the output of said count-up/count-down counter for generating an analog voltage which is proportional to the time difference between the location pulse and the feedback pulse indicating the actual position of said moveable element.

5. A positioning system for positioning a moveable element, comprising:
    a source of pulses;
    a time counter driven by said pulses and providing a digital output;
    a static location count register for storing a manifestation of the location to which it is desired to move the element providing a static digital output;
    means for comparing the output of said static location count and the output of said time counter to thereby produce an output pulse whenever the two compare;
    a first ring circuit;
    a second ring circuit;
    means responsive to said source of pulses for stepping said ring circuits;
    means responsive to a desired location signal for initiating stepping of said first ring;
    means responsive to a feedback signal indicating the actual location of the moveable element for initiating stepping of said second ring;
    means for delaying said feedback signal by a predetermined amount, which amount is equal to the amount of time it takes to step said rings to a predetermined stage thereof;
    means for comparing the ring stages to determine if the time difference between said signal is less than or greater than said predetermined amount;
    means operative when said time difference between said signals is greater than said predetermined amount for gating the same corresponding positions of each ring to a count-up/count-down counter, which is counted up by the stage of one of said rings and is counted down by the stage of the other of said rings; and
    means responsive to the output of said count-up/count-down counter for generating an analog voltage which is proportional to the time difference between the location signal and the feedback signal indicating the actual position of said moveable element.

6. The combination according to claim 5, including:
    means operative when the time difference between said signals is less than said predetermined amount for utilizing the output of said delay circuit and said predetermined stage of the ring which is energized by the first occurring signal, to thereby generate the analog voltage.

7. In a phase detector of the type in which a reversible counter is counted up under control of location pulses of one phase and is counted down under control of feedback pulses of another phase, the output of the counter being proportional to the phase difference, apparatus for developing an analog signal proportional to the error when the error is too small to be detected by the counter, comprising:
    a timing source of regularly occurring clock pulses;
    a first ring stepped by said clock pulses when initiated by a location pulse;
    a second ring stepped by said clock pulses when initiated by a feedback pulse;
    means for delaying said feedback pulse by an amount equal to the amount of time it takes to step a predetermined number of stages of said rings;
    means for inhibiting the output of said reversible counter when the difference between a feedback pulse and a location pulse is less than a predetermined amount; and
    means for generating a control voltage which comprises means for generating a current of one polarity when a stage of the ring corresponding to the maximum delay of said delayed feedback pulse is on and means for generating a current of the opposite polarity in response to said delayed feedback pulse and means for summing the two currents to supply control voltage which is proportional to the difference between the location pulse and the feedback pulse.

References Cited

UNITED STATES PATENTS

| | | | |
|---|---|---|---|
| 2,907,021 | 9/1959 | Woods | 340—347 |
| 3,145,376 | 8/1964 | Currie | 340—347 |
| 3,333,089 | 7/1967 | Saylor et al. | 340—347 |
| 3,366,886 | 1/1968 | Dryden | 235—92 |

MAYNARD R. WILBUR, Primary Examiner

MICHAEL K. WOLENSKY, Assistant Examiner

U.S. Cl. X.R.

235—92; 318—18; 324—83

PO-1050
(5/69)

UNITED STATES PATENT OFFICE
CERTIFICATE OF CORRECTION

Patent No. 3,469,257            Dated September 23, 1969

Inventor(s) Gerhard E. Hoernes and Edward V. Weber

It is certified that error appears in the above-identified patent and that said Letters Patent are hereby corrected as shown below:

Column 3, line 44, after "pulses" insert --26--. Column 5, line 36, delete "of" and insert --for--.

SIGNED AND
SEALED

DEC 23 1969

(SEAL)
Attest:

Edward M. Fletcher, Jr.
Attesting Officer

WILLIAM E. SCHUYLER, JR.
Commissioner of Patents